US009696878B2

(12) United States Patent
Zulch, III et al.

(10) Patent No.: US 9,696,878 B2
(45) Date of Patent: Jul. 4, 2017

(54) SYSTEM AND METHOD FOR ABSTRACTING A DISPLAY

(71) Applicant: Honeywell International Inc., Morristown, NJ (US)

(72) Inventors: Harold Anthony Zulch, III, Phoenix, AZ (US); Thomas D. Judd, Woodinville, WA (US); Andrew Abeyta, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 357 days.

(21) Appl. No.: 14/336,168

(22) Filed: Jul. 21, 2014

(65) Prior Publication Data

US 2016/0019188 A1 Jan. 21, 2016

(51) Int. Cl.
*G06F 3/0483* (2013.01)
*G01C 23/00* (2006.01)

(52) U.S. Cl.
CPC ........... *G06F 3/0483* (2013.01); *G01C 23/00* (2013.01)

(58) Field of Classification Search
CPC .............................. G06F 3/0483; G01C 23/00
See application file for complete search history.

(56) References Cited

U.S. PATENT DOCUMENTS 5,195,995 A 3/1993 Walker
5,393,113 A 2/1995 Walsh
5,527,007 A 6/1996 Weilbacher
5,599,796 A 2/1997 Schinazi et al.
5,601,541 A 2/1997 Swisher
5,608,632 A 3/1997 White
5,865,408 A 2/1999 Swisher et al.
5,872,107 A 2/1999 Schinazi et al.
5,916,297 A 6/1999 Griffin, III et al.

(Continued)

FOREIGN PATENT DOCUMENTS

EP 2551771 1/2013
KR 101089169 11/2011

OTHER PUBLICATIONS

Paul Newby et al., Dlink+CPDLC Users Guide, Dec. 31, 2011, Spectralux Avionics, pp. 7-10.*

(Continued)

*Primary Examiner* — Scott Baderman
*Assistant Examiner* — Seung Jung
(74) *Attorney, Agent, or Firm* — Fogg & Powers LLC

(57) ABSTRACT

A system comprises a physical display unit and an aircraft system component. The aircraft system component is configured to output a first signal for display according to a first display format. The system also includes an abstraction component configured to generate a virtual display page according to the first protocol based on the signal received from the aircraft system component and to map the virtual display page into two or more modified pages. Each of the modified pages is configured according to a second display format and corresponds to a respective portion of the virtual display page. The abstraction component is further configured to output a second signal comprising a first of the two or more modified pages to the physical display unit for display according to the second display format. The abstraction component is configured to output a signal comprising a second modified page based on user input.

14 Claims, 13 Drawing Sheets

(56) References Cited

U.S. PATENT DOCUMENTS

| | | | |
|---|---|---|---|
| 6,112,140 | A | 8/2000 | Hayes et al. |
| 6,121,032 | A | 9/2000 | Cooney, Jr. |
| 6,204,732 | B1 | 3/2001 | Rapoport et al. |
| 6,350,607 | B1 | 2/2002 | Cooney, Jr. |
| 6,386,108 | B1 | 5/2002 | Brooks et al. |
| 6,676,078 | B2 | 1/2004 | Cordina et al. |
| 6,718,409 | B2 | 4/2004 | Houlberg |
| 6,811,955 | B2 | 11/2004 | Wu et al. |
| 7,113,109 | B2 | 9/2006 | Cordina et al. |
| 7,121,509 | B2 | 10/2006 | Cordina et al. |
| 7,191,706 | B2 | 3/2007 | Chase et al. |
| 7,236,345 | B1 | 6/2007 | Roesler et al. |
| 7,382,275 | B2 | 6/2008 | Feldman et al. |
| 7,684,904 | B2 | 3/2010 | Wainwright et al. |
| 8,224,699 | B2 | 7/2012 | Wald et al. |
| 8,229,790 | B2 | 7/2012 | Wald et al. |
| 8,264,376 | B1 | 9/2012 | McLoughlin et al. |
| 8,297,069 | B2 | 10/2012 | Novotny et al. |
| 8,555,210 | B2 | 10/2013 | Yang et al. |
| 8,570,192 | B2 | 10/2013 | McLoughlin et al. |
| 2011/0246975 | A1 | 10/2011 | Baudisson et al. |
| 2013/0166271 | A1 | 6/2013 | Danielsson et al. |

OTHER PUBLICATIONS

Bryan L. Sammons et al., Dlink+ w/CPDLC Technical Description, Jun. 7, 2010, Spectralux Avionics, pp. 1-11.*

"CMA-9000CT Advanced Flight Management and Control Display Unit", "Flight Deck Systems Integration", Mar. 2008, pp. 1-2, Publisher: CMC Electronics, Published in: CA.

"Dlink w/CPDLC", "Retrieved online Jul. 21, 2014 from http://spectralux.com/downloads/spectralux_dlink_cpdlc.pdf", , pp. 1-4, Publisher: Spectralux Avionics; 2012.

"Flight Management Systems", Apr. 2005, pp. 1-8, Publisher: Honeywell International Inc.

Parrilla et al., "Design of a Middleware Interface for ARINC 429 Data Bus", "IEEE Transactions on Aerospace and Electronics Systems", Apr. 2012, pp. 1136-1149, vol. 48, No. 2, Publisher: IEEE.

* cited by examiner

401

| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | | |
|---|---|---|---|---|---|---|---|---|---|---|---|---|---|---|---|---|---|---|---|---|---|---|---|---|---|---|---|
| | 1 | DLK ATC REQUEST | | | | | | | | | | | | | | | | | | | | | | | | 1 | |
| | 2 | | | | | | | | | | | | | | | | | | | | | | | | | 2 | |
| 1L | 3 | < ALTITUDE | | | | | | | | | | | | | | | | | | | | | | | ATIS > | 3 | 1R |
| | 4 | | | | | | | | | | | | | | | | | | | | | | | | | 4 | |
| 2L | 5 | < SPEED | | | | | | | | | | | | | | | | | | | | | | | DEPARTURE > | 5 | 2R |
| | 6 | | | | | | | | | | | | | | | | | | | | | | | | | 6 | |
| 3L | 7 | < ROUTE MOD | | | | | | | | | | | | | | | | | | | | | | | PUSHBACK > | 7 | 3R |
| | 8 | | | | | | | | | | | | | | | | | | | | | | | | | 8 | |
| 4L | 9 | | | | | | | | | | | | | | | | | | | | | | | | TAXI > | 9 | 4R |
| | 10 | | | | | | | | | | | | | | | | | | | | | | | | | 10 | |
| 5L | 11 | < ATC MENU | | | | | | | | | | | | | | | | | | | | | | | OCEANIC > | 11 | 5R |
| | 12 | | | | | | | | | | | | | | | | | | | | | | | | | 12 | |
| 6L | 13 | < DLK MENU | | | | | | | | | | | | | | | | | | | | | | | TWIP > | 13 | 6R |
| | 14 | | | | | | | | | | | | | | | | | | | | | | | | | 14 | |
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | | |

FIG. 4 (Prior Art)

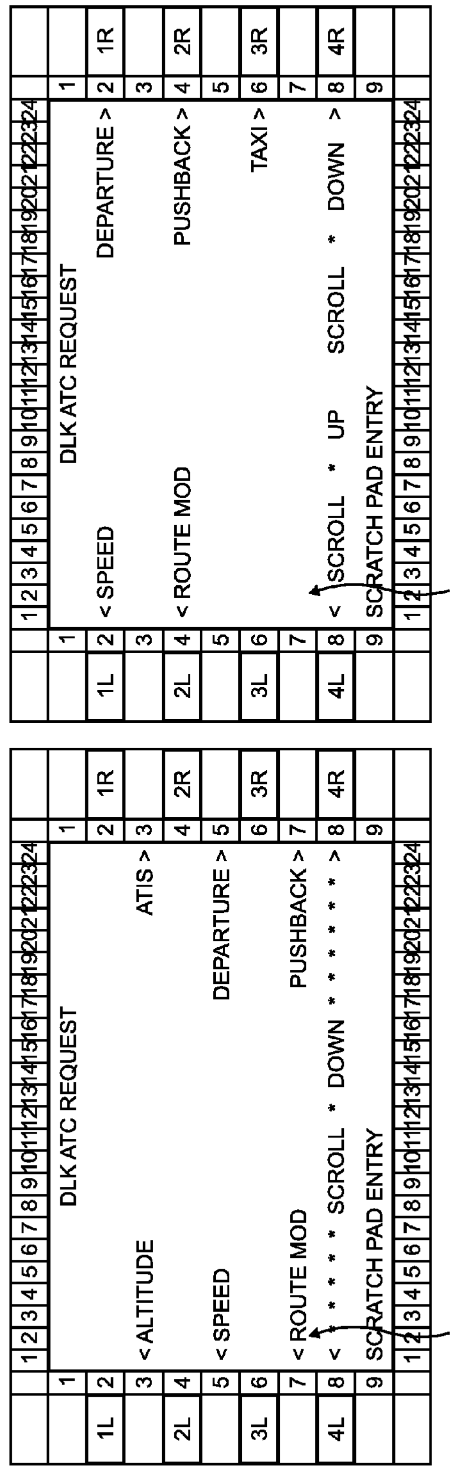
FIG. 8B
FIG. 8A
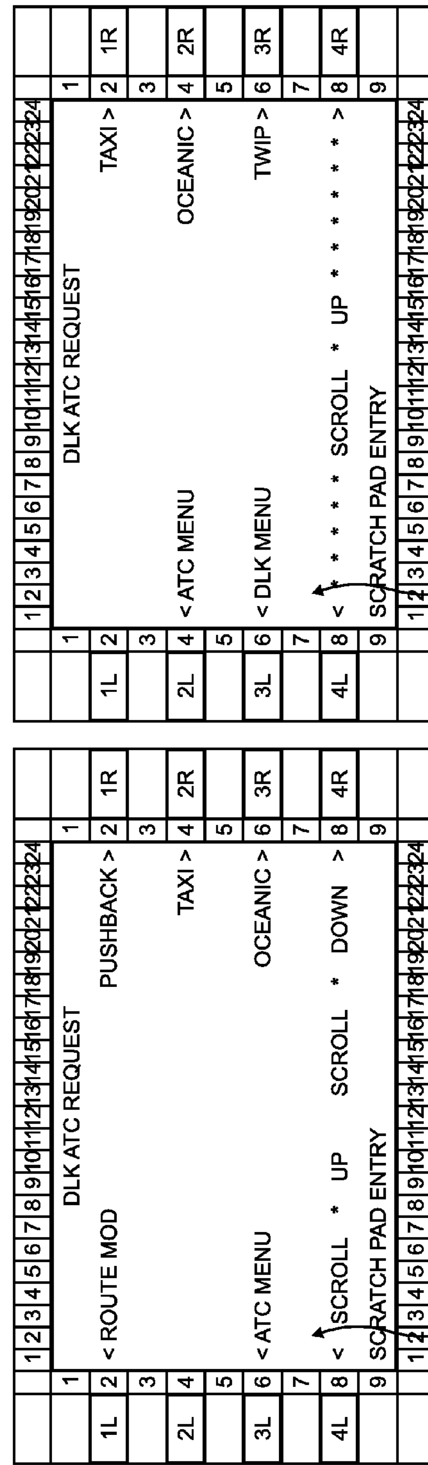
FIG. 8D
FIG. 8C

SYSTEM AND METHOD FOR ABSTRACTING A DISPLAY

BACKGROUND

Many aerospace avionic devices or line replaceable units (LRUs) that need to interact with the flight crew do so through a display device compatible with the Aeronautical Radio, Incorporated (ARINC) 739 standard (referred to herein as an ARINC 739 display device). ARINC 739 display devices are typically Multi-function Control Display Units (MCDUs) or Multi-input Interactive Display Units (MIDUs) and the display is arranged with 14 rows, 24 columns, and 12 Line Select Keys next to the display (six on the left and six on the right). There are also other display devices, such as RS-422 compatible display devices, typically referred to as Control Display Units (CDUs). A CDU display is typically arranged with 9 rows, 24 columns, and 8 Line Select Keys next to the display (four on the left and four on the right).

SUMMARY

In one embodiment, a system is provided. The system comprises a physical display unit configured to display data and an aircraft system component configured to perform one or more functions of an aircraft system. The aircraft system component is configured to output a first signal for display according to a first display format. The system also includes an abstraction component configured to receive the signal output from the aircraft system component. The abstraction component is further configured to generate a virtual display page according to the first protocol based on the signal received from the aircraft system component and to map the virtual display page into two or more modified pages. Each of the modified pages is configured according to a second display format and corresponds to a respective portion of the virtual display page. The abstraction component is further configured to output a second signal comprising a first of the two or more modified pages to the physical display unit for display on the physical display unit according to the second display format. The physical display unit includes a plurality of line select buttons configured to indicate a user selection. The abstraction component is configured to output a signal comprising a second of the two or more modified pages to the physical display unit based on user input.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 4 depicts an exemplary ARINC 739 based display.

FIGS. 8A-8D depict another embodiment of an exemplary layout of modified display pages.

Figure 1:
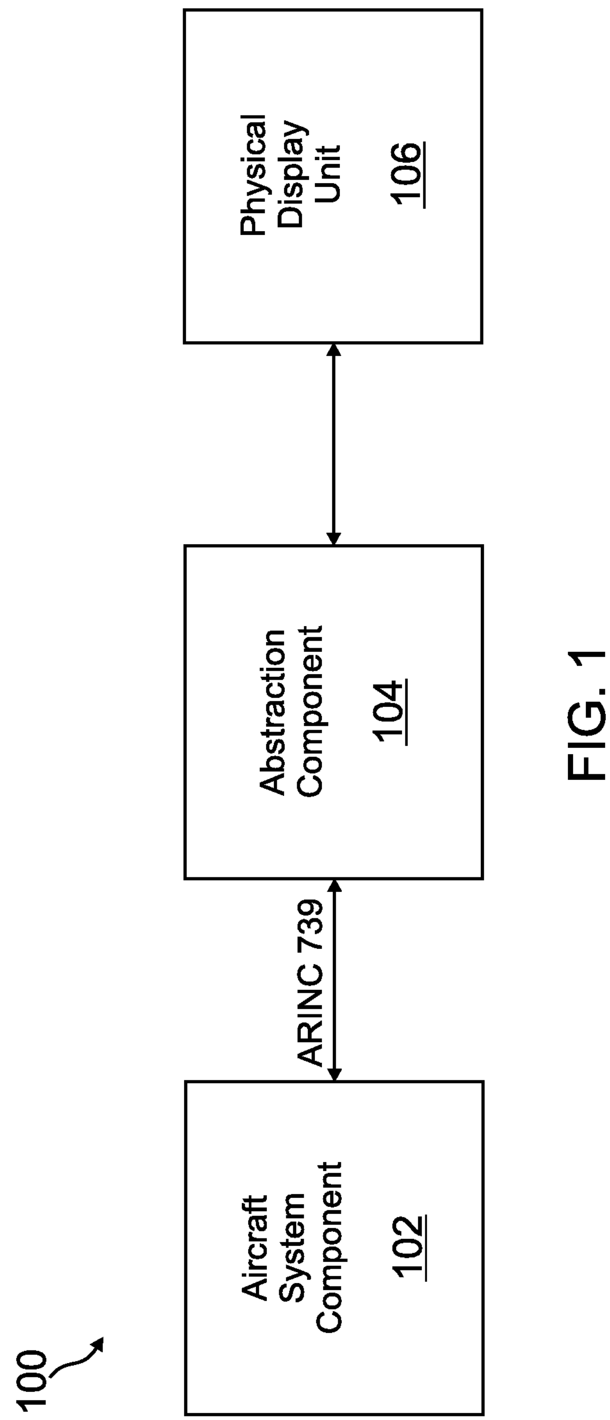
FIG. 1 is a high level block diagram of one embodiment of an exemplary system for abstracting a display.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high level block diagram of a configuration of logical components in one embodiment of a system 100. System 100 includes an aircraft system component 102 configured to process data for display according to a specific protocol or standard. For example, the aircraft system component 102 can include, but is not limited to, one of a Communication Management Unit (CMU)/Communication Management Function (CMF), Flight Management Computer (FMC), Central Maintenance Computer (CMC), Aircraft Condition Monitoring System (ACMS), Satellite Communication Unit (SATCOM), etc. In some embodiments, the data is prepared for display on an Aeronautical Radio, Incorporated (ARINC) 739 based display unit. ARINC 739 is the standard for a Multi-Purpose Control and Display Unit (MCDU) and associated interfaces. Thus, in some embodiments, the aircraft system component 102 is configured to output signals formatted for or otherwise compatible with display on an ARINC 739 MCDU. Although ARINC 739 is discussed herein for purposes of explanation, it is to be understood that other display standards can be used in other embodiments.

Figure 2:
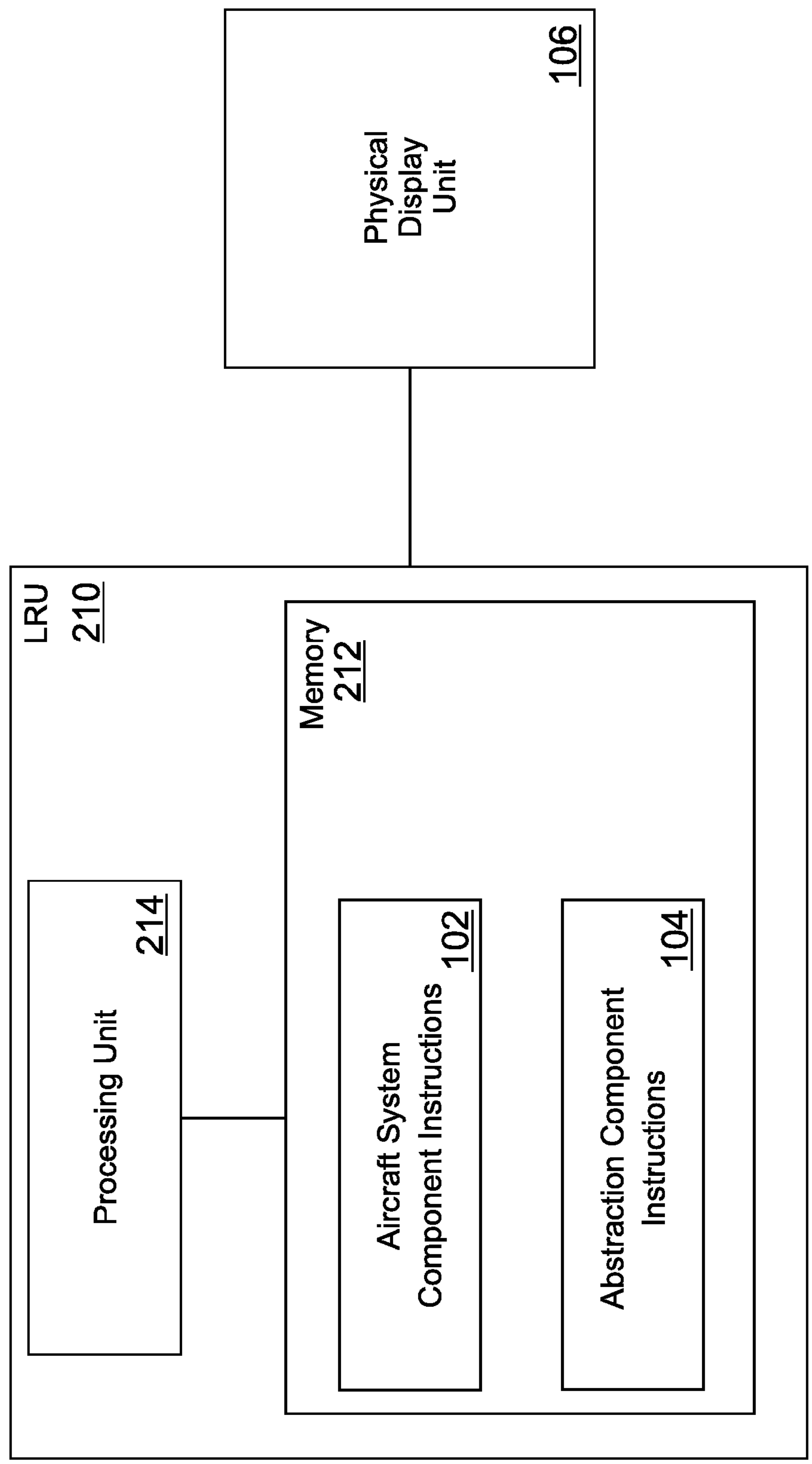
FIG. 2 is a high level block diagram of another embodiment of an exemplary system for abstracting a display.

In addition, as used herein, the term "component" is defined to mean a part of the system, but should not be construed to require that each component be a physically separate and distinct device. That is, two or more components can be implemented in the same or separate physical devices. For example, in the exemplary system shown in FIG. 2, the aircraft system component 102 is implemented in the same Line Replaceable Unit (LRU) 210 as an abstraction component 104. In particular, the aircraft system component 102 and abstraction component 104 are implemented as instructions stored on a memory 212 for execution by a processing unit 214. Although depicted as being stored in the same memory 212 in this example, it is to be understood that separate memory devices can be used for each of aircraft system component instructions 102 and abstraction component instructions 104, in other embodiments. By implementing the abstraction component 104 with instructions separate from the aircraft system component instructions, the aircraft system component instructions do not need to be modified and the aircraft system component does not need to be aware that its data is being displayed on a device that is not compatible with the output of the aircraft system component instructions. Thus, the abstraction component instructions 104 can be used in an existing product or can be used as part of porting an existing product's software baseline to a new product.

Figure 3:
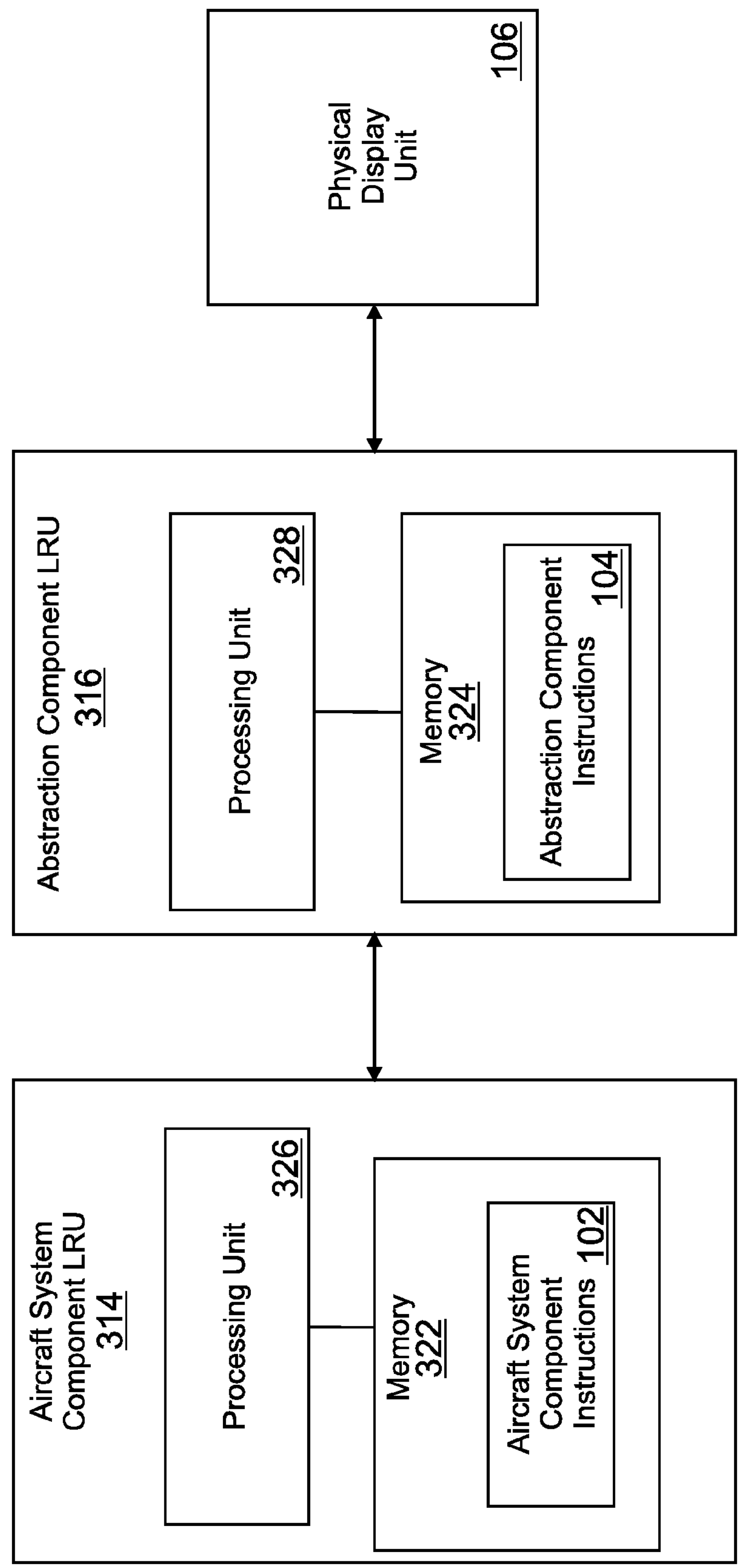
FIG. 3 is a high level block diagram of another embodiment of an exemplary system for abstracting a display

In another embodiment, as shown in FIG. 3, the aircraft system component 102 and the abstraction component 104 are implemented in physically separate LRUs 314 and 316. In the embodiment of FIG. 3, the LRU 314 communicates with the LRU 316 over compatible interfaces. As with the embodiment of FIG. 2, the aircraft system component 102 does not need to be modified or aware that the data is being displayed on a display that it is not compatible with the display format of its output signal.

The system 100 further includes an abstraction component 104 and a physical display unit 106. The abstraction component 104 is configured to determine if the physical display unit 106 is compatible with the display format of the aircraft system component 102. For example, with respect to this embodiment, the abstraction component 104 determines whether the physical display unit 106 is an ARINC 739 compatible display unit. If the physical display unit 106 is compatible with the display standard of the aircraft system component 102, the abstraction component 104 is configured to pass output from the aircraft system component 102 to the physical display unit 106 without changing the format. Hence, in this embodiment, the abstraction component 104 would pass the signal indicating that the data be displayed according to the ARINC 739 standard. As used herein, the term "compatible" is defined to mean that the physical display unit 106 is capable of displaying output from the aircraft system component 102 without the need for special modification or conversion of the output from the aircraft system component 102 and/or the physical display unit 106.

If the physical display unit 106 is not compatible with the display standard of the aircraft system component 102, the abstraction component 104 is configured to provide a bridge between the aircraft system component 102 and the physical display unit 106. In particular, as described in more detail below, the abstraction component 104 generates a virtual display according to the display format of the aircraft system component 102. In this example, the abstraction component 104 generates a virtual ARINC 739 display. An exemplary conventional ARINC 739 display page 401 is shown in FIG. 4. It is to be understood that FIG. 4 is presented by way of example only. As shown in FIG. 4, the ARINC 739 display includes 14 displayed rows and 24 columns on each display page. It is to be understood that the numerals labeling the rows and columns are shown for purposes of explanation only.

The abstraction component 104 uses the data output from the aircraft system component 102 to generate a virtual ARINC 739 display page such as the display page shown in FIG. 4. The virtual display is used within the abstraction component 104 and is not output to the physical display 106. In particular, the abstraction component 104 divides the virtual display page into two or more display pages compatible with the display format of the physical display unit 106. For example, in this embodiment, the physical display unit 106 is a control display unit (CDU) having only 9 displayed rows or lines on each display page. In addition, in this embodiment, the physical display unit 106 includes an Electronic Industries Alliance RS-422 interface. Hence, the abstraction component 104 manages the RS-422 protocol for communication with the physical display unit 106. Although the RS-422 protocol is discussed herein, it is to be understood that other protocols can be used for communication between the abstraction component 104 and the physical display unit 106. In addition, although this example physical display unit 106 is described with respect to having 9 rows, it is to be understood that other numbers of rows can be used in other embodiments.

Figures 5A, 5B:
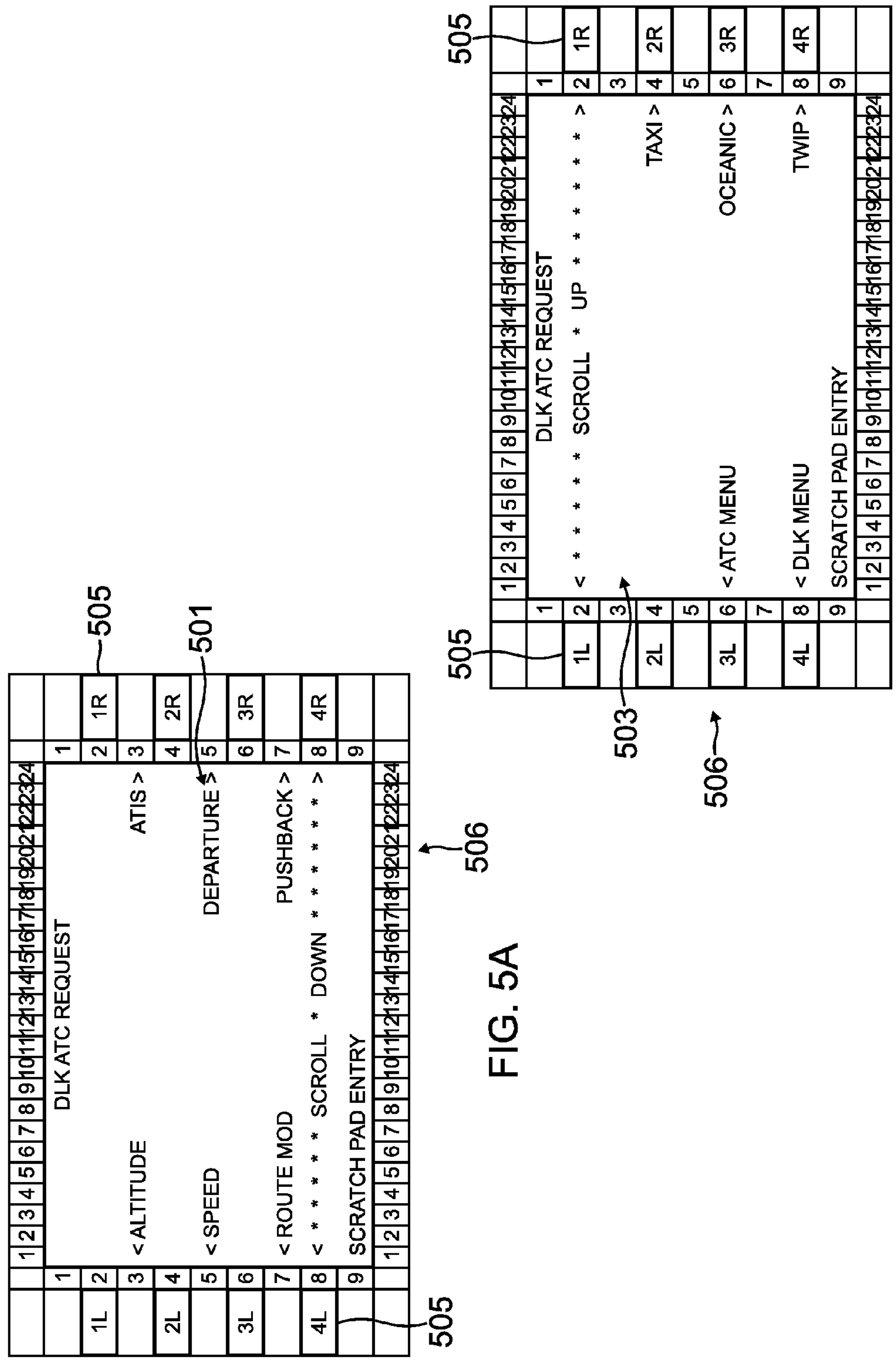
FIGS. 5A-5B depict one embodiment of an exemplary layout of modified display pages.
Figure 6:
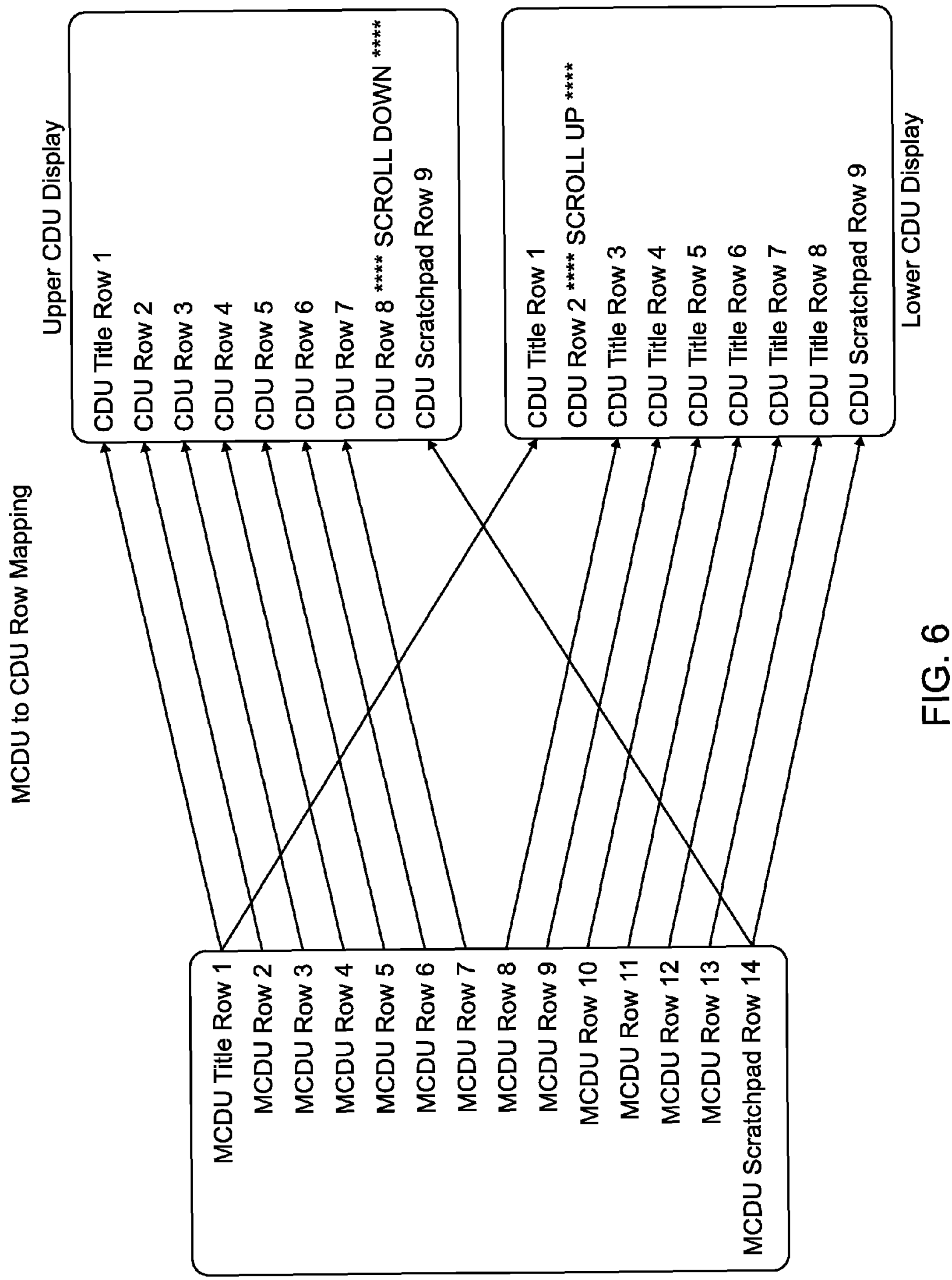
FIG. 6 depicts one embodiment of an exemplary row mapping between a virtual display page and exemplary modified display pages.

In some embodiments, the virtual display page is divided into two pages for display on the physical display unit 106. For example, FIGS. 5A and 5B depict two exemplary pages 501 and 503 displayed on the physical display unit 506. The pages 501 and 503 correspond to the exemplary ARINC 739 page 401 shown in FIG. 4. In this example, page 501 represents the first of the two pages 501/503 displayed on the physical display unit 506. FIG. 6 is a depiction of the associations between the rows of the virtual display page 401 and the pages 501/503 displayed alternately on physical display unit 506.

The page 501 includes a title on row 1 of page 501 which corresponds to the title on row 1 of the virtual display page 401. Rows 2-7 on page 501 include options corresponding to the respective Controller-Pilot Data Link Communications (CPDLC) page (e.g. Downlink ATC request options in this example). In particular, rows 2-7 of page 501 correspond to rows 2-7 of the virtual display page 401. Row 8 on page 501 is reserved on page 501 for indicating an option to navigate to page 503 and does not correspond to a row on the virtual display page 401. In particular, in this embodiment, row 8 includes the text "Scroll Down". Thus, row 8 is a boundary row between the display pages 501 and 503. Additionally, in some embodiments, the color of the text on row 8 is different than the color used for rows 1-7 to highlight for a user that more information is contained on another page. For example, the color orange can be used, in some embodiments, to alert the crew that they need to scroll to view the whole MCDU page. Finally, row 9 of page 501 is reserved for the scratchpad and corresponds to row 14 of the virtual display page 401. As understood by one of skill in the art, the scratchpad is used to display alphanumeric characters either entered by the user or generated an aircraft system on the aircraft.

Similar to page 501, page 503 includes the title of the page on row 1 and corresponds to row 1 of the virtual display page 401. Since both page 501 and 503 display portions of the same ARINC 739 display page, the title for both pages 501 and 503 is the same. By preserving the same title on row 1 of both pages 501 and 503, a user is able to quickly ascertain that the two pages are continuations of each other and what Controller-Pilot Data Link Communications (CPDLC) page is displayed on the pages 501 and 503. However, it is to be understood that the title does not need to be presented on each page in other embodiments. Rows 3-8 of page 503 correspond to rows 8-13 of the virtual display page 401. Row 9 of page 503 is reserved for the scratchpad and also corresponds to row 14 of the virtual display page 401, similar to page 501.

Page 503 also includes a scrolling or boundary row to navigate back to page 501. However, in this embodiment, the scrolling row on page 503 is located on row 2 rather than row 8 as in page 501. The scrolling row on row 2 is not associated with a row in the virtual display page 401. Although row 2 is used in this embodiment of page 503, it is to be understood that the scrolling row in both pages 501 and 503 could be located on any row associated with one of the line select buttons 505.

In particular, each of rows 2, 4, 6, and 8 in both pages 501 and 503 is associated with a respective line select button 505 on the physical display unit 506. In order to select one of the options or to navigate between pages 501 and 503, a user presses or selects the corresponding line select button 505. The abstraction component 104 is configured to manage the associations of the line select buttons 505 with the respective rows on each of the pages 501 and 503. In addition, the abstraction component 104 is configured to translate user selections of the line select buttons 505 on physical display unit 506 to the corresponding line select buttons associated with the virtual display page 401. For example, as shown in FIG. 4, an ARINC 739 compatible display has 6 line select buttons on each side of the display. In contrast, the CDU display unit 506 only has 4 line select buttons on each side of the display. Therefore, the abstraction component 104 translates between the line select buttons associated with pages 501 and 503 to a respective line select button that would be associated with the virtual display page 401. The abstraction component 104 passes the signals indicating the selections of the line select buttons back to the aircraft system component 102, such that it appears to the aircraft system component 102 that line select buttons on an ARINC 739 display have been selected. Indeed, the aircraft system component 102 does not need to be adjusted or modified to implement the embodiments described herein. Rather, the abstraction component manages the mapping between the display formats and the aircraft system component 102 operates as a conventional component. An exemplary mapping of line select buttons 505 on physical display unit 506 to line select buttons of an ARINC 739 compatible display is shown in FIG. 7.

Figure 7:
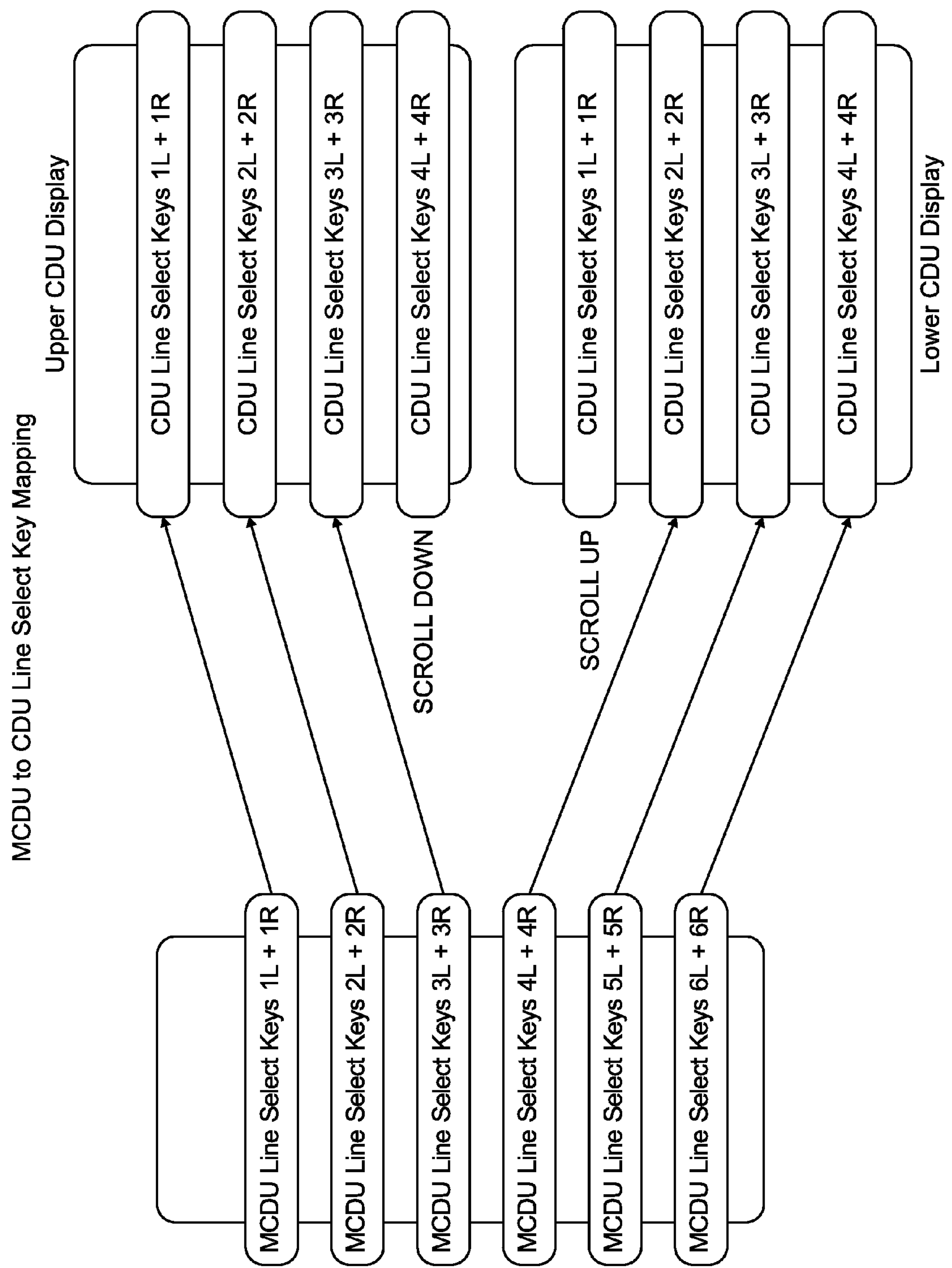
FIG. 7 depicts one embodiment of an exemplary line select key mapping between a virtual display page and exemplary modified display pages.

As shown in FIG. 7, buttons 1L and 1R of page 501 is associated with buttons 1L and 1R, respectively, of an ARINC 379 compatible display. Similarly, buttons 2L & 2R and 3L & 3R of page 501 are associated with buttons 2L & 2R and 3L & 3R, respectively, of an ARINC 739 compatible display. Buttons 4L and 4R of page 501 are not mapped to buttons of an ARINC 739 display, but are reserved for changing from page 501 to page 503, in this embodiment. In other embodiments, other keys or buttons on the CDU can be used for navigating between pages 501 and 503. For example, in some embodiments a page up/page down key on the CDU can be associated with navigating between the pages as opposed to using a line select key.

Buttons 1L and 1R of page 503 are also not associated with or mapped to buttons of an ARINC 739 display, but are reserved for changing from page 503 to page 501. Buttons 2L & 2R, 3L & 3R, and 4L and 4R of page 503 are each mapped to buttons 4L & 4R, 5L & 5R, and 6L & 6R, respectively, as shown in FIG. 7.

It is to be understood that the mappings between lines/rows shown in FIG. 6 and the mappings between line select buttons shown in FIG. 7 are provided by way of example only. In addition, it is to be understood that, in other embodiments, the abstraction component 104 is configured to divide a virtual ARINC 739 display into more than two display pages for display on physical display unit 106. For example, FIGS. 8A-8D depict 4 display pages 801, 807, 809, and 811. Each of pages 801, 807, 809 and 811 correspond to a respective section of the virtual display page 401 shown in FIG. 4.

Figures 9A, 9B:
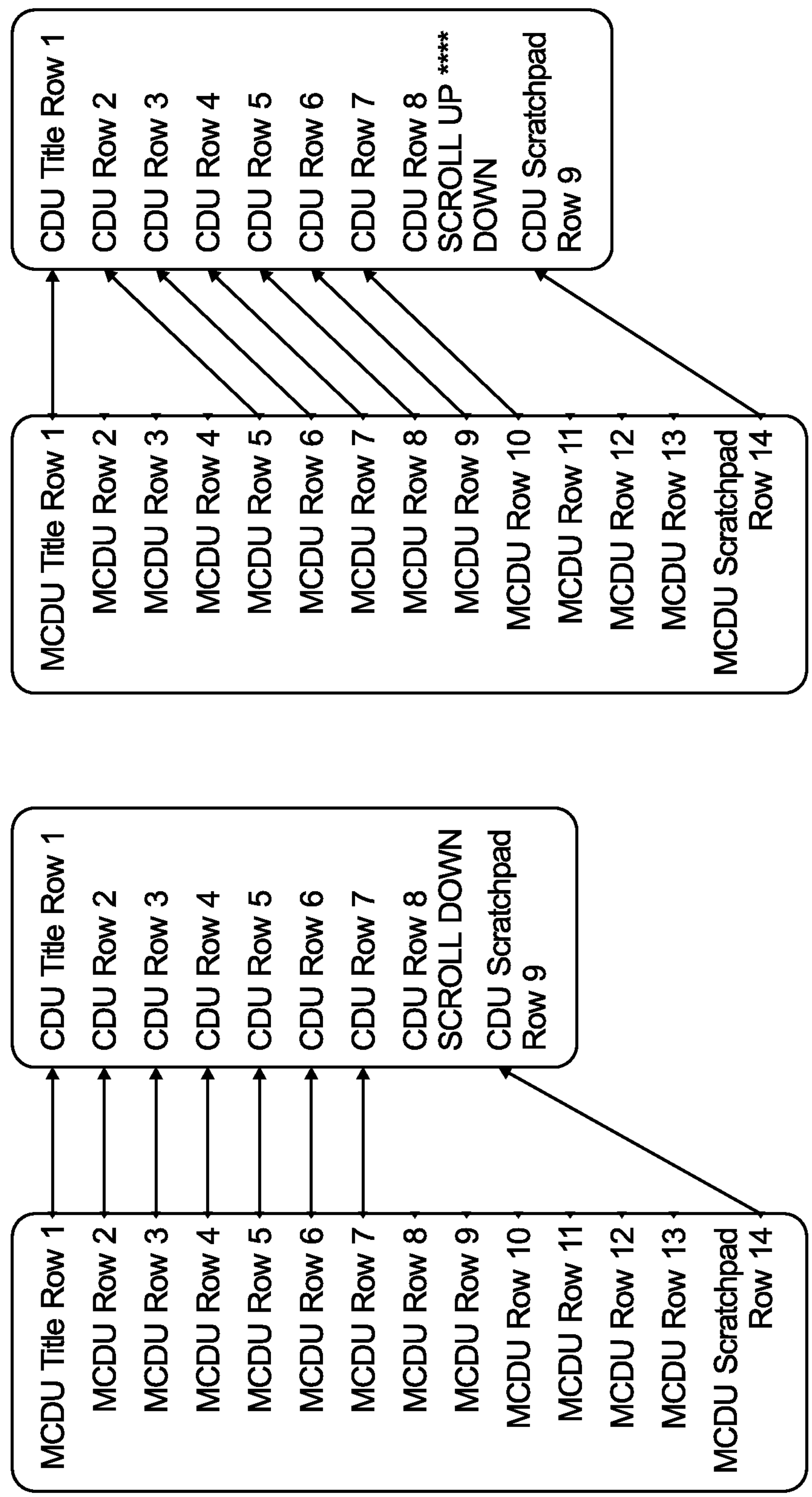
FIGS. 9A-9D depict another embodiment of an exemplary row mapping between a virtual display page and exemplary modified display pages.
Figure 10A:
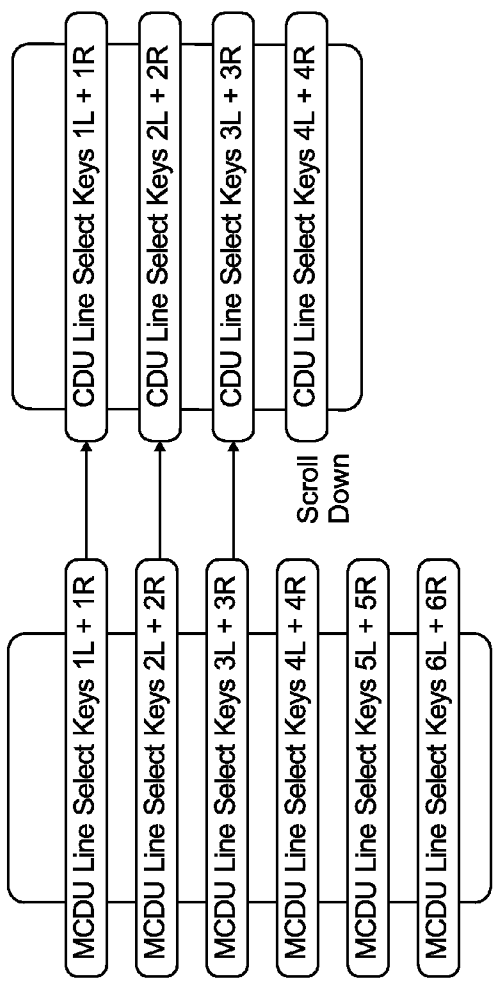
FIGS. 10A-10D depict another embodiment of an exemplary line select key mapping between a virtual display page and exemplary modified display pages.
Figure 10B:
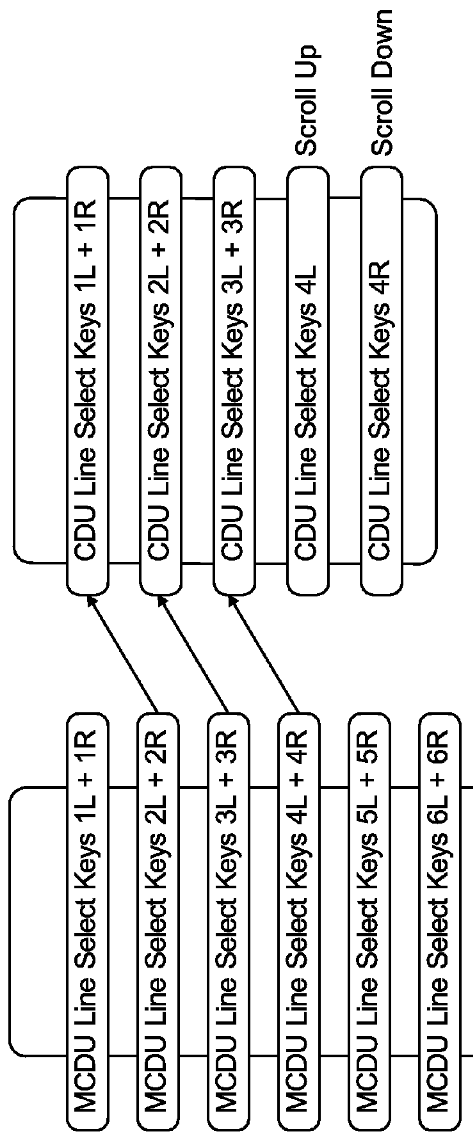

In the embodiment depicted in FIGS. 8A-8D, navigation between the display pages 801, 807, 809, and 811 simulates incremental scrolling of the page rather than scrolling from a top half to a bottom half, as in FIGS. 5A and 5B. In particular, each of the sections of the virtual display page corresponding to display pages 801, 807, 809, and 811 overlaps at least one row of another of the sections. For example, FIG. 8A is similar to FIG. 5A described above and has the same row and line select button mappings, as shown in FIGS. 9A and 10A respectively. However, when the line select button corresponding to scrolling down is selected, page 807 is displayed. The mapping of line select buttons and rows between page 807 and a virtual ARINC 739 display are shown in FIGS. 9B and 10B. As depicted in FIG. 8B, the display is shifted by three lines or rows, in this embodiment, such that the change to page 807 simulates an incremental scrolling of the page. Both display page 807 and 801 display rows for "Speed—Departure" and "Route Mod—Pushback" in this example. In addition, the scrolling row associated with row 8 is different from the scrolling row in row 8 of page 801. In particular, line select button 4L is associated with scrolling up back to page 801 and line select button 4R is associated with scrolling down to page 809.

Figure 9D:
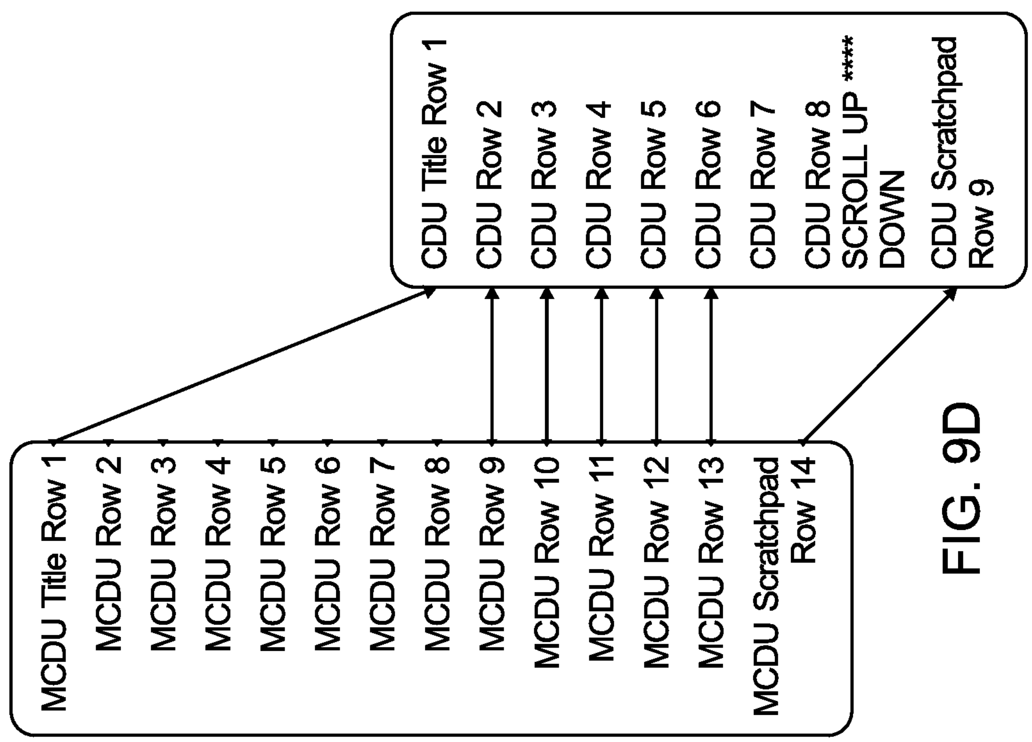
Figure 9C:
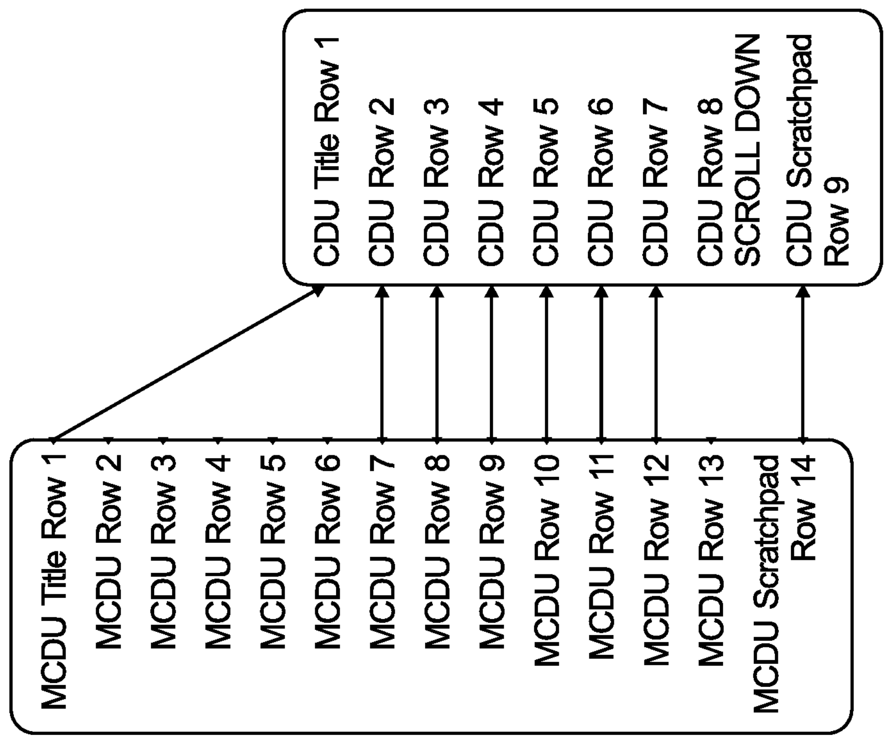
Figure 10C:
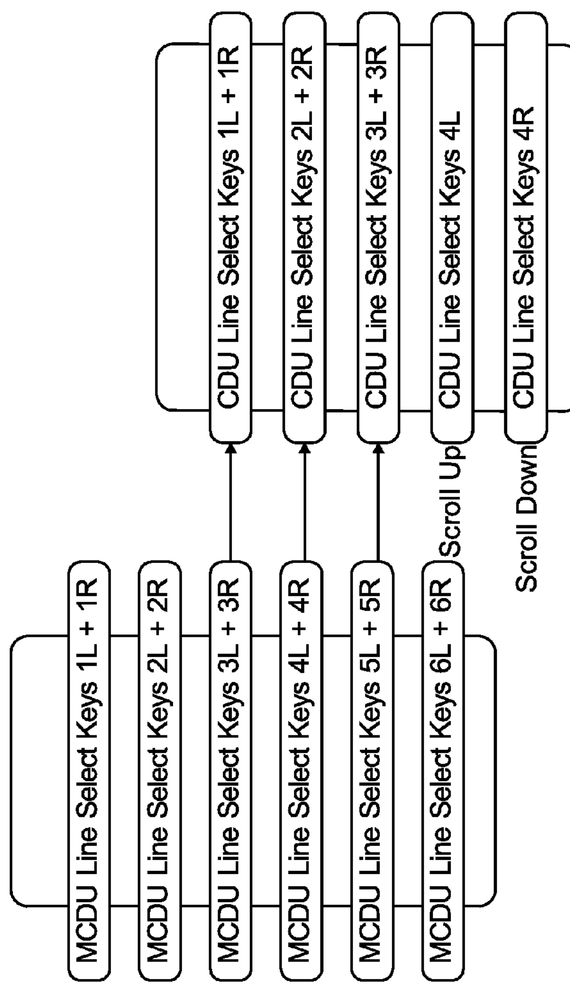
Figure 10D:
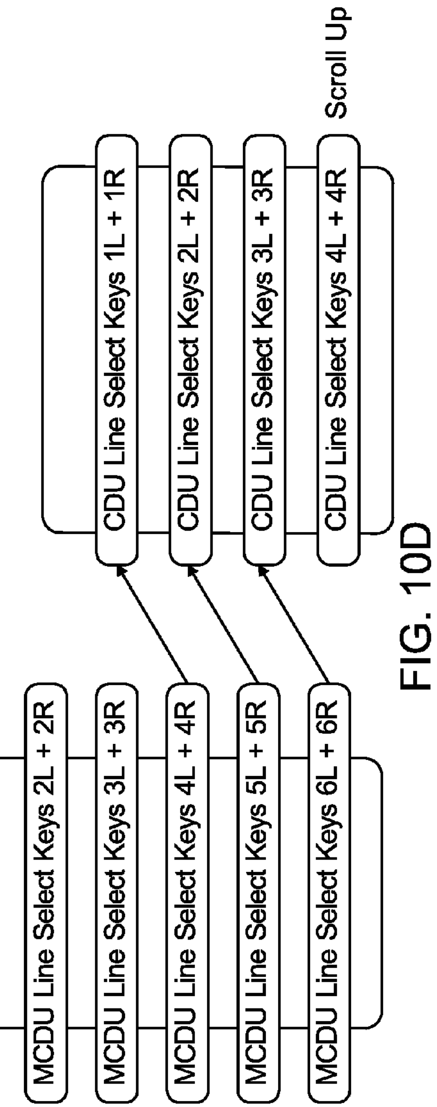
Figure 11:
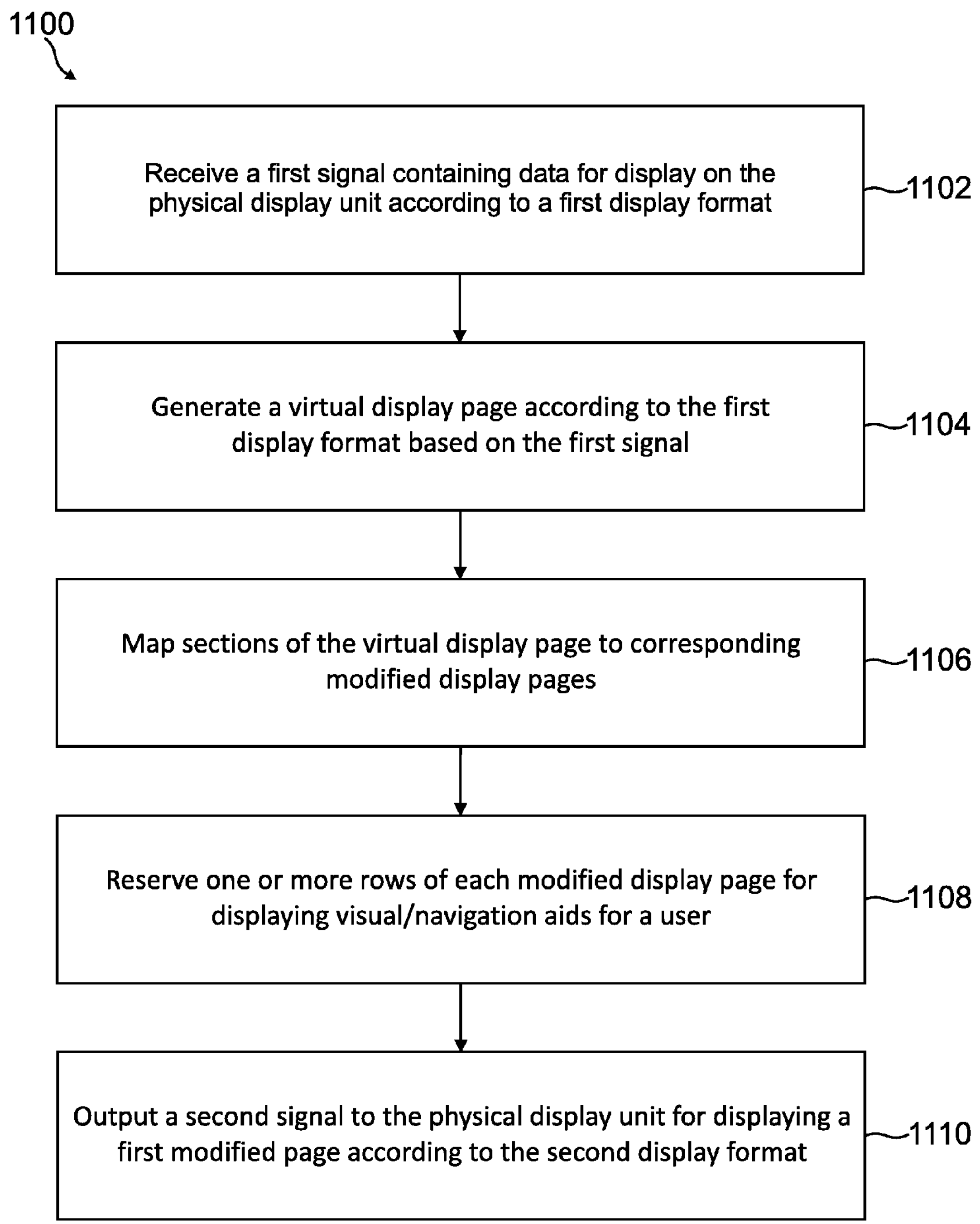
FIG. 11 is flow chart depicting one embodiment of an exemplary method of displaying data on a physical display unit.

Compared to page 807, page 809 shifts the displayed data by 2 rows or lines as shown in FIG. 8C. The row mappings and line select button mappings for display page 807 are shown in FIGS. 9C and 10C, respectively. Similar to page 807, scrolling row 8 on page 809 is divided so that line select button 4L is associated with scrolling back to page 807 and line select button 4R is associated with scrolling down to page 811. Page 811 is similar to page 503 described above. However, as shown in FIG. 8D, the scrolling row of page 811 is displayed on row 8 rather than row 2, in this example. The mappings of rows and line select buttons between page 811 and a virtual ARINC 739 display are shown in FIGS. 9D and 10D, respectively. Thus, in this embodiment, a user is able to incrementally scroll up and down by navigating between the pages 801, 807, 809, and 811. It is to be understood that the description of FIGS. 8A-8D is presented by way of example only. For example, the number of rows shifted between each page can be different in other embodiments from that described herein FIG. 11 is a flow chart depicting one embodiment of an exemplary method 1100 of displaying data on a physical display unit. Method 1100 can be implemented by an abstraction component, such as abstraction component 104 described above. At block 1102, a first signal containing data for display on the physical display unit according to a first display format is received. In some embodiments, the first display format is based on the ARINC 739 standard having 14 displayed rows on a display page, as described above. At block 1104, a virtual display page according to the first display format is generated based on the first signal.

At block 1106, sections of the virtual display page are mapped to corresponding modified display pages, each of the modified display pages formatted according to a second display format. In particular, the second display format pages has fewer displayed rows on a display page than the first display format. For example, in some embodiments, the second display format has 9 displayed rows on each display page. In addition, in some embodiments, mapping sections of the virtual display page includes mapping sections of the virtual display page to two modified display pages. In other embodiments, mapping sections of the virtual display page includes mapping sections of the virtual display page to more than two modified display pages. Furthermore, in some embodiments, the sections of the virtual display page do not overlap. That is, each section does not share or include a row that is included in another section. In other embodiments, each section of the virtual display page mapped to one of the modified display pages shares at least one row with another section of the virtual display page.

At block 1108, one or more rows of each modified display page is reserved for displaying visual/navigation aids for a user. For example, in some embodiments a row is reserved in each of the modified display pages for one or more of a page title corresponding to a title of the virtual display page, a scratchpad entry, and/or an option to display other modified pages corresponding to other sections of the virtual display page. It is to be understood that the specific row used for the title, scratchpad entry, or scroll option can be different from that described with respect to FIGS. 5A-5B and FIGS. 8A-8D. At block 1110, a second signal is output to the physical display unit for displaying a first modified page of the modified display pages according to the second display format.

It is to be understood that some or all of the steps in method 1100 can be implemented as computer readable instructions, such as abstraction component instructions, discussed above. In particular, in some embodiments, a processing unit includes or functions with software programs, firmware or other computer readable instructions for carrying out various methods, process tasks, calculations, and control functions, used in performing some or all of the steps in method 1100.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Example Embodiments

Example 1 includes a system comprising: a physical display unit configured to display data; an aircraft system component configured to perform one or more functions of an aircraft system, wherein the aircraft system component is configured to output a first signal for display according to a first display format; an abstraction component configured to receive the signal output from the aircraft system component, the abstraction component further configured to generate a virtual display page according to the first protocol based on the signal received from the aircraft system component and to map the virtual display page into two or more modified pages, each of the modified pages configured according to a second display format and corresponding to a respective portion of the virtual display page; wherein the abstraction component is further configured to output a second signal comprising a first of the two or more modified pages to the physical display unit for display on the physical display unit according to the second display format; wherein the physical display unit includes a plurality of line select buttons configured to indicate a user selection; wherein the abstraction component is configured to output a signal comprising a second of the two or more modified pages to the physical display unit based on user input.

Example 2 includes the system of Example 1, wherein the first display format is based on the Aeronautical Radio, Incorporated (ARINC) 739 standard having 14 displayed rows on a page; and wherein the second display format is based on a format having 9 displayed rows on a page.

Example 3 includes the system of any of Examples 1-2, wherein the abstraction component is further configured to translate selections of the line select button selections received from the physical display unit to corresponding selections in the virtual display page and to output the translated selections to the aircraft system component.

Example 4 includes the system of any of Examples 1-3, wherein the two or more modified pages comprises two modified pages; wherein the first of the two modified pages corresponds to a first portion of the virtual display page and the second of the two modified pages corresponds to a second portion; and wherein the first portion and the second portion of the virtual display page do not overlap.

Example 5 includes the system of any of Examples 1-3, wherein the respective portion of the virtual display page corresponding to each of the two or more modified pages overlaps a respective portion corresponding to a different modified page of the two or more modified pages.

Example 6 includes the system of any of Examples 1-5, wherein each of the two or more modified pages includes a row reserved for displaying a page title corresponding to a title of the virtual display page.

Example 7 includes the system of any of Examples 1-6, wherein each of the two or more modified pages includes a row reserved for displaying a scratchpad entry.

Example 8 includes the system of any of Examples 1-7, wherein each of the two or more modified pages includes a row reserved for indicating an option to display other modified pages of the two or more modified pages.

Example 9 includes the system of any of Examples 1-8, wherein the abstraction component and the aircraft system component form part of a single line replaceable unit.

Example 10 includes a method of displaying data on a physical display unit, the method comprising: receiving a first signal containing data for display on the physical display unit according to a first format; generating a virtual display page according to the first format based on the first signal; mapping sections of the virtual display page to corresponding modified display pages, each of the modified display pages formatted according to a second format; and outputting a second signal to the physical display unit for displaying a first modified page of the modified display pages according to the second format.

Example 11 includes the method of Example 10, wherein the first format is based on the Aeronautical Radio, Incorporated (ARINC) 739 standard having 14 displayed rows on a page; and wherein the second format is based on a format having 9 displayed rows on a page.

Example 12 includes the method of any of Examples 10-11, wherein mapping sections of the virtual display page to corresponding modified display pages includes mapping virtual line select buttons corresponding to rows of the virtual display page to physical line select buttons corresponding to rows of each of the modified display pages.

Example 13 includes the method of any of Examples 10-12, wherein mapping sections of the virtual display page comprises: mapping a first section of the virtual display page to a first modified page; and mapping a second section of the virtual display page to a second modified page; wherein the first and second sections of the virtual display page do not overlap.

Example 14 includes the method of any of Examples 10-12, wherein mapping sections of the virtual display page comprises: mapping a first section of the virtual display page to a first modified page; and mapping a second section of the virtual display page to a second modified page; wherein at least one row of both the first section and the second section of the virtual display page is the same.

Example 15 includes the method of any of Examples 10-14, further comprising at least one of: reserving a row on each of the modified display pages for displaying a page title corresponding to a title of the virtual display page; reserving a row on each of the modified display pages for displaying a scratchpad entry; or reserving a row on each of the modified display pages for indicating an option to display other modified pages corresponding to other sections of the virtual display page.

Example 16 includes a program product comprising a processor-readable medium on which program instructions are embodied, wherein the program instructions are configured, when executed by at least one programmable processor, to cause the at least one programmable processor to: generate a virtual display page according to a first display format based on a first signal containing data for display on a physical display unit; map sections of the virtual display page to corresponding modified display pages, each of the modified display pages formatted according to a second format; and output a second signal to the physical display unit for displaying a first modified page of the modified display pages according to the second format.

Example 17 includes the program product of Example 16, wherein the program instructions are further configured to cause the at least one programmable processor to map virtual line select buttons corresponding to rows of the virtual display page to physical line select buttons of the physical display unit corresponding to rows of each of the modified display pages when displayed.

Example 18 includes the program product of any of Examples 16-17, wherein the program instructions are further configured to cause the at least one programmable processor to: map a first section of the virtual display page to a first modified page; and map a second section of the virtual display page to a second modified page; wherein the first and second sections of the virtual display page do not overlap.

Example 19 includes the program product of any of Examples 16-17, wherein the program instructions are further configured to cause the at least one programmable processor to: map a first section of the virtual display page to a first modified page; and map a second section of the virtual display page to a second modified page; wherein at least one row of both the first section and the second section of the virtual display page is the same.

Example 20 includes the program product of any of Examples 16-19, wherein the program instructions are further configured to cause the at least one programmable processor to reserve at least one of: a row on each of the modified display pages for displaying a page title corresponding to a title of the virtual display page; a row on each of the modified display pages for displaying a scratchpad entry; or a row on each of the modified display pages for indicating an option to display other modified pages corresponding to other sections of the virtual display page.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:

a physical display unit, configured to display data;

an aircraft system component configured to perform one or more functions of an aircraft system, wherein the aircraft system component is configured to output a first signal for display according to a first display format;

an abstraction component configured to receive the first signal from the aircraft system component, the abstraction component further configured to generate a virtual display page according to a first protocol based on the first signal received from the aircraft system component and to map the virtual display page into two modified display pages, each of the modified display pages configured according to a second display format and corresponding to a respective portion of the virtual display page;

wherein the abstraction component is further configured to output a second signal comprising a first of the two modified display pages to the physical display unit for display on the physical display unit according to the second display format;

wherein the physical display unit includes a plurality of line select buttons configured to indicate a user selection;

wherein if the physical display unit is compatible with the second display format and incompatible with the first display format, then the abstraction component is configured to output the second signal comprising a second of the two modified display pages to the physical display unit based on user input; and wherein at least one row of the virtual display page corresponding to at least one row of both the first and the second modified display pages that overlap.

2. The system of claim 1, wherein the first display format is based on the Aeronautical Radio, Incorporated (ARINC) 739 standard having 14 displayed rows on a page; and wherein the second display format is based on a format having 9 displayed rows on a page.

3. The system of claim 1, wherein the abstraction component is further configured to translate selections of the line select button selections received from the physical display unit to corresponding selections in the virtual display page and to output the translated selections to the aircraft system component.

4. The system of claim 1, wherein each of the two or more modified pages includes a row reserved for displaying a page title corresponding to a title of the virtual display page.

5. The system of claim 1, wherein each of the two or more modified pages includes a row reserved for displaying a scratchpad entry.

6. The system of claim 1, wherein each of the two or more modified pages includes a row reserved for indicating an option to display other modified pages of the two or more modified pages.

7. The system of claim 1, wherein the abstraction component and the aircraft system component form part of a single line replaceable unit.

8. A method of displaying data on a physical display unit, the method comprising:

receiving a first signal, from an aircraft system component, containing data for display on the physical display unit according to a first display format;

generating a virtual display page according to the first display format based on the first signal;

mapping sections of the virtual display page to corresponding modified display pages, each of the modified display pages formatted according to a second display format;

wherein mapping sections of the virtual display page comprises:

mapping a first section of the virtual display page to a first modified display page;

mapping a second section of the virtual display page to a second modified display page; and wherein at least one row of the virtual display page corresponding to at least one row of both the first and the second modified display pages that overlap; and outputting a second signal to the physical display unit for displaying a first modified page of the modified display pages according to the second display format.

9. The method of claim 8, wherein the first display format is based on the Aeronautical Radio, Incorporated (ARINC) 739 standard having 14 displayed rows on a page; and wherein the second display format is based on a format having 9 displayed rows on a page.

10. The method of claim 8, wherein mapping sections of the virtual display page to corresponding modified display pages includes mapping virtual line select buttons corresponding to rows of the virtual display page to physical line select buttons corresponding to rows of each of the modified display pages.

11. The method of claim 8, further comprising at least one of:

reserving a row on each of the modified display pages for displaying a page title corresponding to a title of the virtual display page;

reserving a row on each of the modified display pages for displaying a scratchpad entry; and reserving a row on each of the modified display pages for indicating an option to display other modified pages corresponding to other sections of the virtual display page.

12. A program product comprising a processor-readable non-transitory medium on which program instructions are embodied, wherein the program instructions are configured, when executed by at least one programmable processor, to cause the at least one programmable processor to:

generate a virtual display page according to a first display format based on a first signal, received from an aircraft system component, containing data for display on a physical display unit;

map sections of the virtual display page to corresponding modified display pages, each of the modified display pages formatted according to a second display format;

wherein map sections of the virtual display page comprises:

map a first section of the virtual display page to a first modified display page;

map a second section of the virtual display page to a second modified display page; and wherein at least one row of the virtual display page corresponding to at least one row of both the first and the second modified display pages that overlap; and output a second signal to the physical display unit for displaying a first modified page of the modified display pages according to the second display format.

13. The program product of claim 12, wherein the program instructions are further configured to cause the at least one programmable processor to map virtual line select buttons corresponding to rows of the virtual display page to physical line select buttons of the physical display unit corresponding to rows of each of the modified display pages when displayed.

14. The program product of claim 12, wherein the program instructions are further configured to cause the at least one programmable processor to reserve at least one of:

a row on each of the modified display pages for displaying a page title corresponding to a title of the virtual display page;

a row on each of the modified display pages for displaying a scratchpad entry; and a row on each of the modified display pages for indicating an option to display other modified pages corresponding to other sections of the virtual display page.

* * * * *